(12) United States Patent
Munisamy et al.

(10) Patent No.: US 12,174,978 B2
(45) Date of Patent: Dec. 24, 2024

(54) SYSTEMS AND METHODS TO PROVIDE TEMPORARY DOCUMENT ACCESS FOR SECURE FILE SHARING

(71) Applicant: MCKINSEY & COMPANY, INC., New York, NY (US)

(72) Inventors: Ashok Munisamy, Somerset, NJ (US); David Kolínský, Prague (CZ); Jaymin Jagmohan, Waldwick, NJ (US); Jerry Liu, New Hyde Park, NY (US)

(73) Assignee: MCKINSEY & COMPANY, INC., New York, NY (US)

( * ) Notice: Subject to any disclaimer, the term of this patent is extended or adjusted under 35 U.S.C. 154(b) by 360 days.

(21) Appl. No.: 17/569,297

(22) Filed: Jan. 5, 2022

(65) Prior Publication Data

US 2023/0214508 A1 Jul. 6, 2023

(51) Int. Cl.
*G06F 21/62* (2013.01)
*G06F 21/10* (2013.01)
*G06F 21/60* (2013.01)

(52) U.S. Cl.
CPC .............. *G06F 21/62* (2013.01); *G06F 21/10* (2013.01); *G06F 21/602* (2013.01)

(58) Field of Classification Search
CPC ......... G06F 21/62; G06F 21/10; G06F 21/602
See application file for complete search history.

(56) References Cited

U.S. PATENT DOCUMENTS

| | | | | |
|---|---|---|---|---|
| 11,501,012 B1* | 11/2022 | Milich | ................ | H04L 63/0435 |
| 11,811,774 B1* | 11/2023 | Higgins | ................ | H04L 63/101 |
| 11,853,442 B1* | 12/2023 | Lim | ....................... | G06F 16/986 |
| 2003/0187798 A1* | 10/2003 | McKinley | .............. | G08G 1/017 |
| | | | | 380/54 |
| 2009/0037519 A1* | 2/2009 | Young | ................. | G06F 16/9574 |
| | | | | 709/203 |
| 2014/0033327 A1* | 1/2014 | Conte | .................... | G06F 21/60 |
| | | | | 726/28 |
| 2014/0245015 A1* | 8/2014 | Velamoor | ............. | H04L 63/108 |
| | | | | 713/171 |
| 2018/0218133 A1* | 8/2018 | Hussain | ................ | H04L 63/108 |
| 2022/0374547 A1* | 11/2022 | Arikapudi | ........... | G06F 21/6245 |
| 2022/0405329 A1* | 12/2022 | Lelouch | .................. | G06F 21/31 |
| 2023/0119733 A1* | 4/2023 | Gadiya | ................ | G06V 30/412 |
| | | | | 715/221 |

(Continued)

*Primary Examiner* — Stephen T Gundry
(74) *Attorney, Agent, or Firm* — MARSHALL, GERSTEIN & BORUN LLP; Randall G. Rueth

(57) ABSTRACT

Techniques for providing temporary document access for secure file sharing are disclosed. An example method includes receiving a request from a first user to share a file, and generating, by an encryption module, a secure access link corresponding to the file that does not indicate a storage platform or a file name. The example method also includes transmitting the secure access link to a second user, and receiving an input from the second user during the accessibility duration corresponding to the secure access link. Responsive to receiving the input, the example method includes validating the access key to determine whether or not the second user should be granted access to the file; and responsive to determining that the user should be granted access to the file, retrieving an updated version of the file from the storage platform, and transmitting the updated version of the file to the second user.

20 Claims, 11 Drawing Sheets

(56) References Cited

U.S. PATENT DOCUMENTS

| | | | | |
|---|---|---|---|---|
| 2023/0205734 A1* | 6/2023 | Zhang | G06F 16/93 |
| | | | 707/722 |
| 2023/0205904 A1* | 6/2023 | Hassan | G06F 21/6218 |
| | | | 726/26 |
| 2023/0222137 A1* | 7/2023 | Aucinas | H04L 63/10 |
| | | | 707/802 |
| 2023/0274019 A1* | 8/2023 | Miranda | G06F 21/31 |
| | | | 726/26 |
| 2023/0333715 A1* | 10/2023 | Spaetzel | G06F 21/64 |
| 2023/0413050 A1* | 12/2023 | Avetisov | H04L 63/083 |
| 2024/0037066 A1* | 2/2024 | Kamath | G06F 16/122 |
| 2024/0095402 A1* | 3/2024 | Heart | G06F 21/6227 |
| 2024/0111738 A1* | 4/2024 | Chenthamarakshan | |
| | | | G06F 16/22 |
| 2024/0126841 A1* | 4/2024 | Baldwin | G06K 7/1417 |
| 2024/0126900 A1* | 4/2024 | Drey | G06F 21/602 |

\* cited by examiner

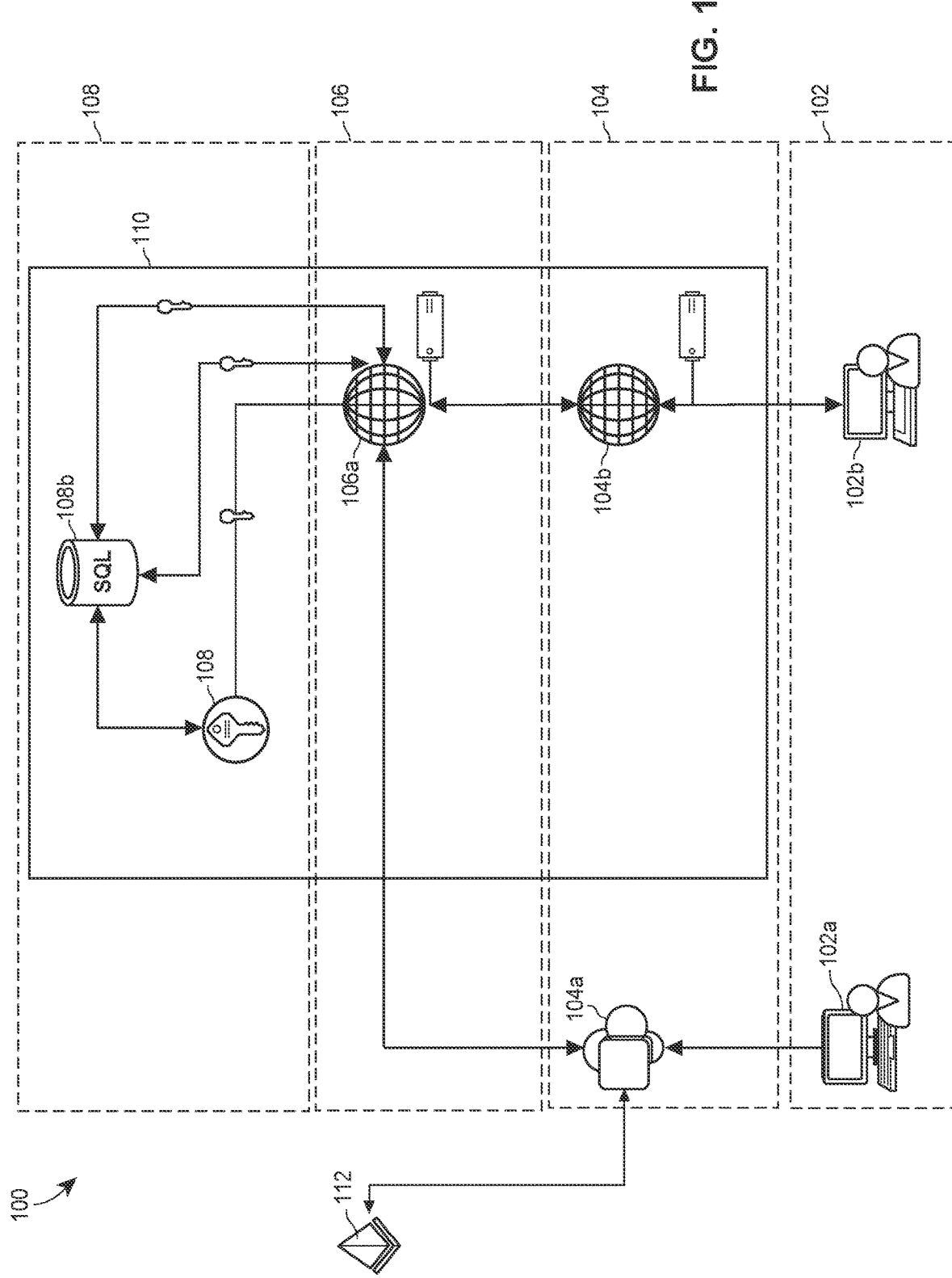

Sharing

SJ Site for Jane  ☆ Not following  📤 Share

Home | ☐ Edit in grid view  ⊡ Open ∨  ↗ Share  ⇔ Copy link  ↓ Download  🗑 Delete  ✏ Rename  @ Share one time  ✕ 1 selected  All Documents ∨  🔍 ⊙ ✏

Internal Documents

🔍 Search this library  302

Home
Joint Client Documents
Engagement Members
Site Properties
Final Docs Report
Recycle bin

Internal Documents — 304

| Name | ...ed By ∨ | DocumentTag ∨ | Add column ∨ |
|---|---|---|---|
| 302a → ☐ 01 Admin | Admin | | |
| 302b → ☐ 02 Background Documents | Admin | | |
| 302c → ☐ 03 Client Data | Admin | | |
| ☐ 04 Team Working Folder | Admin | | |
| ☐ 05 Internal PSS | Admin | | |
| ☐ 06 Client Meeting | Admin | | |
| ☐ 99 Final Docs | | | |
| ⊙ 📄 Document.docx  ↗ ⋮ | | | |
| 302d | | | 304a |

Menu:
- Open
- Preview
- Share
- Copy Link
- Manage access
- Download
- Delete
- Automate
- Rename
- Move to
- Copy to
- Version history
- Alert me
- More
  - Share one time
  - Manege one-time sharing
  - Final Document
  - Details

Sharing

SJ Site for Jane

| | | |
|---|---|---|
| Home | | Edit in grid view ⊟ Open ∨ ⇗ Share ⇌ Copy link ↓ Download 🗑 Delete ✎ Rename |
| Internal Documents | | |

🔍 Search this library

Internal Documents

| Name | Modified ∨ | Modified By ∨ |
|---|---|---|
| 01 Admin | March 12 | John Doe Admin |
| 02 Background Documents | March 12 | John Doe Admin |
| 03 Client Data | March 12 | John Doe Admin |
| 04 Team Working Folder | March 12 | John Doe Admin |
| 05 Internal PSS | March 12 | John Doe Admin |
| 06 Client Meeting | March 12 | John Doe Admin |
| 99 Final Docs | | |
| 📄 Document.docx  🔗 : May 13 | | John Doe Admin |

Home
Joint Client Documents
Engagement Members
Site Properties
Final Docs Report
Recycle bin

---

📄 Document.docx  _412_

— Collapse all  ↻ Refresh  🔒 Revoke all

∨ enxo@njkfnsg.com

∨ enzo123@test.com  📅 5/19/2021  ⊘ ○

Jane Doe  5/19/2021  ⊘ ○

∨ enzo@client.com  📅 5/20/2021 — 414a  ⊘ ○ ✗

Jane Doe  5/19/2021  ⊘ ○

∨ test@client.com  📅 5/19/2021 — 414b  ⊘ ○

Jane Doe  5/19/2021  ⊘ ○

∨ test@test.com  📅  ⊘ ○ ✗

John Doe Admin  5/13/2021

SYSTEMS AND METHODS TO PROVIDE TEMPORARY DOCUMENT ACCESS FOR SECURE FILE SHARING

FIELD OF THE DISCLOSURE

The present disclosure generally relates to secure file sharing, and more particularly, to systems and methods to provide temporary document access for secure file sharing.

BACKGROUND

Generally speaking, most (if not all) modern companies utilize some form of document sharing through one of the many commercially available storage/sharing platforms (e.g., SharePoint, OneDrive, etc.). These companies typically purchase and/or otherwise establish licenses to use such platforms in a manner that enables some/all company employees (also referenced herein as "internal users") to access shared files/documents within the database(s) allocated to the company while excluding those who do not have valid company login credentials (also referenced herein as "external users"). As a result, these storage/sharing platforms offer secure and convenient access to shared documents for internal use within a company.

However, various inconveniences and/or otherwise problems arise when internal users attempt to share documents with external users. For example, each external user is typically forced to setup an individual account with access credentials for the specific storage/sharing platform where the document is stored. These access credentials are typically valid for an unspecified amount of time, such that the external user is able to access the shared document in perpetuity. This presents a security risk for the company, as an external user may have access to a shared document beyond when the external user was intended to have access to the shared document. To illustrate, an external user's input may be required regarding an aspect of the information contained in the shared document at a first time, but confidential information may be added to the shared document at a second time that the external user is not permitted to access. With conventional access credentials, the external user would be able to impermissibly access the shared document, thereby exposing the confidential information.

Moreover, conventional storage/sharing platforms do not allow users to easily track what documents have been shared, how many times the shared documents have been downloaded, and/or whether or not to revoke access for certain users. As a result, internal users managing shared documents or files may not know how many external users have been granted access to the shared documents/files, and may be similarly unaware of whether or not those external users have modified or downloaded the shared document. The external users may thus modify and/or download the documents/files with impunity, and in certain instances, may invite additional external users that should not have access to the documents/files without the knowledge of the internal user. The internal user may not know that a particular external user was impermissibly invited by another external user, and thus may not immediately revoke the particular external user's access, allowing the particular external user an opportunity to download (i.e., steal) and/or modify the documents/files.

As another example, external user's must also typically login to the specific storage/sharing platform, navigate the user interfaces to locate the shared document, and then download the shared document from the platform. Such requirements generally result in a dissatisfactory user experience due to unfamiliarity with the user interface of the platform, and corresponding losses of time while the external user attempts to locate the shared document. These issues are greatly magnified as the number of external users invited to share a document/file is increased. For example, it is not uncommon for shared documents/files to include many dozens of external users, all of whom are required by conventional systems to access the shared documents/files as described above. In all, conventional sharing processes utilizing storage/sharing platforms create and/or otherwise suffer from numerous security issues and inefficiencies.

Accordingly, there is a need for systems and methods for providing temporary document access for secure file sharing to provide increased security and efficiency of sharing documents/files between internal and external users.

SUMMARY

Generally, the techniques for providing temporary document access for secure file sharing described herein enable a first user (e.g., an internal user) to generate and transmit a secure access link to second user (e.g., an external user), thereby enabling the second user to access a secure file during an accessibility duration. As referenced herein, the terms "secure document" and "secure file" are utilized interchangeably herein to refer to information that is contained in a storage platform.

In an example application of the present techniques, a first user associated with a first company may desire to share a secure file with a second user who is associated with a second company and does not have access credentials for the storage platform utilized by the first company. The first user may generate and/or otherwise transmit a request to share the secure file, and the request may be processed by a secure access application, such that an encryption module of the application generates a secure access link corresponding to the secure file. The secure access link may include an access key, and may only permit the second user access to the secure file within an accessibility duration (e.g., 7 days). Moreover, the secure access link may not indicate the file name of the secure file or the storage platform on which the secure file is stored. In any event, the first user may send this secure access link to the second user, who may then access the secure file through the link during the accessibility duration. Once the accessibility duration has elapsed, the secure access link will no longer grant the second user (or any other user) access to the secure file, ensuring that the secure file is again restricted from access by external users.

In accordance with the discussions herein, the present disclosure includes improvements in computer functionality at least because the disclosure describes that a system, e.g., one or more servers or computing devices, is improved in that the security of data (e.g., documents, files, etc.) stored at the servers/computing devices comprising the storage platforms is enhanced by a secure access application, including an encryption module, a key vault, a key query database, and a document retrieval module. As is discussed elsewhere in the present disclosure, the secure access application, executing on the one or more servers or other computing devices, is able to quickly and efficiently generate secure access links and verify access credentials to files/documents stored on a storage platform. That is, the present disclosure describes improvements in the functioning of the computer itself because the one or more servers or computing devices are enhanced with a secure access application to moderate external user access to stored files and documents, thereby allowing data and storage platform security to be improved, and in particular, allowing security of secure files/documents to be improved.

For similar reasons, the present disclosure relates to improvements to other technologies or technical fields at least because the present disclosure describes or introduces improvements in the field of storage platform security management. Namely, the secure access application executing on the server or other computing devices improves the field of storage platform security management by introducing the capability to provide temporary access to secure files in a manner that was previously unachievable using conventional techniques. This improves over conventional techniques at least because such techniques lack the ability to generate secure access links, and are otherwise simply not capable of monitoring external user access during an accessibility duration, after which, the external user's access is eliminated.

In addition, the present disclosure includes specific features other than what is well-understood, routine, conventional activity in the field, or adding unconventional steps that confine the claim to a particular useful application, e.g., generating secure access links that include an access key and enable a user (e.g., an external user) to access the file during an accessibility duration, wherein the secure access link does not indicate the storage platform or the file name of the secure file, among others.

In an embodiment, a computer-implemented method for providing temporary document access for secure file sharing is disclosed. The method comprises receiving, by one or more processors, a request from a first user to share a file with a file name, wherein the file is stored on a storage platform; generating, by an encryption module, a secure access link corresponding to the file that includes an access key and enables a second user to access the file during an accessibility duration, wherein the secure access link does not indicate the storage platform or the file name; transmitting, by the one or more processors, the secure access link to the second user; receiving, by the one or more processors, an input from the second user during the accessibility duration corresponding to the secure access link to access the file; responsive to receiving the input, validating, by the one or more processors, the access key to determine whether or not the second user should be granted access to the file; responsive to determining that the user should be granted access to the file, retrieving, by the one or more processors, an updated version of the file from the storage platform; and transmitting, by the one or more processors, the updated version of the file to the second user.

In an embodiment, a system for providing temporary document access for secure file sharing is disclosed. The system may include a memory storing a set of computer-readable instructions comprising at least an encryption module; and a processor interfacing with the memory, and configured to execute the set of computer-readable instructions to cause the processor to: receive a request from a first user to share a file with a file name, wherein the file is stored on a storage platform, generate, by the encryption module, a secure access link corresponding to the file that includes an access key and enables a second user to access the file during an accessibility duration, wherein the secure access link does not indicate the storage platform or the file name, transmit the secure access link to the second user, receive an input from the second user during the accessibility duration corresponding to the secure access link to access the file, responsive to receiving the input, validate the access key to determine whether or not the second user should be granted access to the file, responsive to determining that the user should be granted access to the file, retrieve an updated version of the file from the storage platform, and transmit the updated version of the file to the second user.

In an embodiment, a non-transitory computer-readable storage medium having stored thereon a set of instructions, executable by at least one processor, for providing temporary document access for secure file sharing is disclosed. The instructions may include instructions for receiving a request from a first user to share a file with a file name, wherein the file is stored on a storage platform; instructions for generating, by an encryption module, a secure access link corresponding to the file that includes an access key and enables a second user to access the file during an accessibility duration, wherein the secure access link does not indicate the storage platform or the file name; instructions for transmitting the secure access link to the second user; instructions for receiving an input from the second user during the accessibility duration corresponding to the secure access link to access the file; responsive to receiving the input, instructions for validating the access key to determine whether or not the second user should be granted access to the file; responsive to determining that the user should be granted access to the file, instructions for retrieving an updated version of the file from the storage platform; and instructions for transmitting the updated version of the file to the second user.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive and/or limiting.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 1 illustrates an example system for providing temporary document access for secure file sharing, in accordance with various embodiments described herein.

FIGS. 3A-3D are a series of user interfaces that are configured to enable a user to generate and transmit a secure access link providing temporary document access to another user, in accordance with various embodiments described herein.

FIGS. 4A-4C are another series of user interfaces that are configured to enable a user to manage the secure file sharing activity of other users that have been provided temporary access to a secure file, in accordance with various embodiments described herein.

Figure 2A:
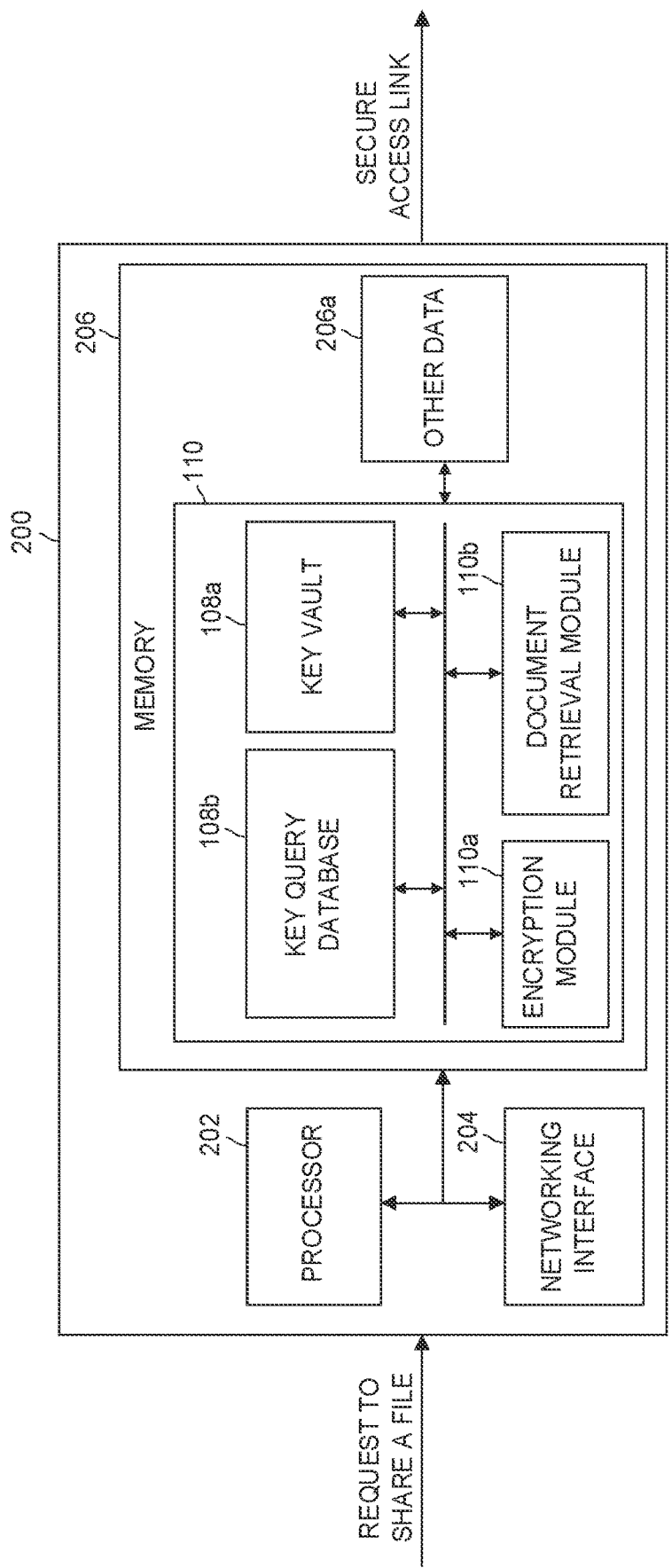
FIG. 2A illustrates an example workflow for generating a secure access link utilizing a portion of the example system of FIG. 1, in accordance with various embodiments described herein.

The Figures depict preferred embodiments for purposes of illustration only. Alternative embodiments of the systems and methods illustrated herein may be employed without departing from the principles of the invention described herein.

DETAILED DESCRIPTION OF THE INVENTION

FIG. 1 illustrates an example system 100 for providing temporary document access for secure file sharing, in accordance with various embodiments described herein. In the example embodiment of FIG. 1, the example system 100 has several layers, including a user layer 102, a presentation layer 104, a backend layer 106, and a database layer 108. Each layer represents one or more components and/or functionalities provided by the components that comprise the example system 100. Collectively, though, these layers receive requests to generate secure access links, generate the secure access links, transmit the secure access links to the intended user(s), receive access requests from the intended user(s) through the secure access links, validate the access credentials of the intended user(s), and provide the intended user(s) with updated versions of the secure files. Additionally, much of the communication between the internal user and the external user may be controlled by a secure access application 110, which may generally generate, store, and/or validate access keys provided with requests to share and/or access secure files.

The user layer 102 generally includes computing devices that enable users to access one or more of the other layers (e.g., 104, 106, 108) within the example system 100. The internal user computing device 102a may have direct access to a company managed and/or otherwise private storage platform 104a within the presentation layer 104, and may enable an internal user to upload, modify, and/or otherwise manage files stored on the private storage platform 104a. The internal user computing device 102a may also enable the internal user to generate requests to share files stored on the private storage platform 104a. More specifically, the internal user may utilize the internal user computing device 102a to generate these requests through the private storage platform 104a, which may forward the requests to a secure access application backend 106a within the backend layer 106 for further processing, as described further herein.

By contrast, the external user computing device 102b may not have direct access to the company managed and/or otherwise private storage platform 104a within the presentation layer 104, and instead, may enable an external user to download updated versions of a secure file through a secure access link. The external user computing device 102b may receive the secure access link as a result of an internal user requesting such a link, and the secure access application backend 106a generating the secure access link and pushing the link to the external user computing device 102b. When an external user submits an access request by interacting with the secure access link (referenced herein as an "input" or an "external user input"), the external user computing device 102b may push the external user input to an interface portion 104b of the secure access application 110, which subsequently pushes the input to the secure access application backend 106a. When the secure access application 110 validates the access key provided as part of the external user input, the application 110 may retrieve an updated version of the secure file from the private storage platform 104a and push the updated version of the secure file to the external user computing device 102b for the external user to view/modify/etc.

In certain aspects, the internal/external user computing devices 102a, 102b may comprise mobile devices and/or client devices for accessing and/or communicating with the secure access application 110. In various embodiments, the internal/external user computing devices 102a, 102b may comprise a desktop computer, a laptop computer, a cellular phone, a mobile phone, a tablet device, a personal digital assistant (PDA), or the like, including, by non-limiting example, an APPLE iPhone or iPad device or a GOOGLE ANDROID based mobile phone or table. In addition, the internal/external user computing devices 102a. 102b may implement or execute an operating system (OS) or mobile platform such as Apple's iOS and/or Google's Android operation system. Any of the internal/external user computing devices 102a, 102b may comprise one or more processors and/or one or more memories for storing, implementing, or executing computing instructions or code, e.g., a mobile application, as described in various embodiments herein.

Moreover, the internal/external user computing devices 102a, 102b may comprise a wireless transceiver to receive and transmit communications to and/or from the secure access application 110. In addition, the internal/external user computing devices 102a, 102b may include a display screen for displaying secure files, graphics, images, text, data, pixels, features, and/or other such visualizations or information as described herein. In various embodiments, secure files, graphics, images, text, data, pixels, features, and/or other such visualizations or information may be received from the secure access application 110 for display on the display screen of the internal/external user computing devices 102a, 102b. Additionally, or alternatively, the internal/external user computing devices 102a, 102b may comprise, implement, have access to, render, or otherwise expose, at least in part, an interface or a graphical user interface (GUI) for displaying text and/or images on its display screen, as described further herein.

In any event, the presentation layer 104 includes the private storage platform 104a and the interface portion 104b of the secure access application 110. Generally, the presentation layer 104 represents the components of the example system 100 that enable a user (e.g., an internal/external user) to view and/or interact with the secure files of the private storage platform 104a. For example, the private storage platform 104a serves as the components through which an internal user may view and/or edit secure files, as the internal user computing device 102a has direct access to the private storage platform 104a. The external user computing device 102b does not have similar direct access, so the external user may view and/or edit secure files through the interface portion 104b of the secure access application 110. Moreover, the example system 100 also includes an active directory 112 that generally manages the access of internal users to the private storage platform 104a. For example, the active directory 112 may include single sign-on (SSO)

and/or multi-factor authentication (MFA) functionality, and may provide secure access for internal users through the authorized internal user computing devices 102a.

The backend layer 106 includes the secure access application backend 106a, which generally moderates communications between the internal user computing device 102a and the external computing device 102b. More specifically, the secure access application backend 106a may act as a gateway between the external user computing device 102b and the private storage platform 104a, such that when the backend 106a receives authorized inputs (e.g., resulting from a secure access link) from the external user computing device 102b, the backend 106a may retrieve secure files from the private storage platform 104a and transmit the secure files to the external user computing device 102b.

Further, the secure access application backend 106a may moderate inputs to the database layer 108. When an internal user generates a request to share a secure file, the secure access application backend 106a may receive the request, and in certain aspects, may generate the secure access link with an access key, such that the secure access link does not indicate either the file name of the secure file or the storage platform. However, it should be understood that, in certain aspects, any of the secure access application backend 106a, the key vault 108a, and/or the key query database 108b may generate the access key and/or ensure that the secure access link does not indicate the file name of the secure file or the storage platform. Thus, only for the case of discussion, generating access keys and secure access link names/file paths are referenced herein as actions performed by the secure access application backend 106a.

In any event, the secure access application backend 106a may then transmit the access key to the key vault 108a for encryption, and thereafter transmit the secure access link to the internal user computing device 102a. The internal user (using the internal user computing device 102a) may then transmit the secure access link to the external user. Subsequently, when an external user provides an input by interacting with the secure access link, the secure access application backend 106a may query the key query database 108b to determine whether or not the access key included as part of the input matches an access key stored in the key query database 108b corresponding to the secure file also indicated in the input. If the secure access application backend 106a determines that the access key included as part of the input matches the access key in the key query database 108b corresponding to the secure file, the secure access application backend 106a may retrieve the secure file from the private storage platform 104a, and transmit the secure file to the external user computing device 102b. In certain aspects, the backend 106a may transmit the secure access link to the external user.

Generally, each time the secure file is shared with one or more external users, the secure access application backend 106a along with the database layer 108 may generate, encrypt, and store a new access key. For example, a particular secure file within the platform 104a may be shared at a first instance with two external users, and as a result, the secure access application backend 106a and database layer 108 may generate, encrypt, and store a first access key for both external users corresponding to the particular secure file. At a second instance, the secure file may be shared with a third external user, and as a result, the secure access application backend 106a and database layer 108 may generate, encrypt, and store a second access key for the third external user corresponding to the particular secure file that is different from the first access key. In this manner, the secure access application backend 106a and the database layer 108 ensure secure access for each set of external users who have been granted access to the particular secure file, while simultaneously allowing the internal user to revoke access to any set of external users (e.g., the first and second external users) without impacting the secure access of other external users who have also been granted secure access to the particular secure file (e.g., the third external user).

The database layer 108 includes the key vault 108a and the key query database 108b, and generally manages access keys to secure files contained within the private storage platform 104a. In particular, the key vault 108a may encrypt and/or otherwise secure one or more access keys associated with one or more secure files within the private storage platform 104a. The key query database 108b may receive access keys included as part of inputs from external users, and may validate the access keys by comparing them with the access keys stored in the key query database 108b in response to inputs from the secure access application backend 106a. In the event that an access key included as part of an input from an external user matches an access key stored in the key query database 108b, and that the secure file indicated by the input matches the secure file corresponding to the matching access key, then the key query database 108b may return a signal to the secure access application backend 106a indicating that the input is valid. As such, the external user may be granted access to the secure file. In other words, the key query database 108b may validate the access credentials (e.g., access key, indicated secure file) included as part of inputs from external users. However, if either the access key included as part of the input does not match any stored access keys in the key query database 108b, and/or the secure file indicated in the input does not match the secure file associated with the matching key, then the key query database 108b may return a signal to the secure access application backend 106a indicating that the input is invalid. Accordingly, the external user may not be granted access to the secure file.

As previously mentioned, the secure access application 110 may control communication between internal users and external users by generating, storing, and/or validating access keys provided with requests to share and/or access secure files, and retrieving updated versions of the secure files. Broadly speaking, the secure access application 110 may be hosted on one or more computer servers. In various embodiments, secure access application 110 may be hosted on multiple servers, which may comprise a multiple, redundant, or replicated servers as part of a server farm. Further, the secure access application 110 may be implemented on cloud-based servers, such as a cloud-based computing platform. For example, secure access application 110 may be hosted on any one or more cloud-based platform(s) such as MICROSOFT AZURE, or the like. The platform hosting, storing, and/or otherwise including the secure access application 110 may include one or more processor(s) (not shown) as well as one or more computer memories (not shown).

In particular, as illustrated in FIG. 2A, the secure access application 110 may be hosted and/or otherwise stored on a hosting platform 200 that additionally includes one or more processors 202, a networking interface 204, and one or more memories 206. Moreover, the secure access application 110 may include an encryption module 110a and a document retrieval module 110b, which may both be included in and/or otherwise associated with the application backend (e.g., secure access application backend 106a). Moreover, in certain instances, the encryption module 110a may be the key vault 108a. FIG. 2A generally illustrates an example workflow for generating a secure access link utilizing the secure access application 110 of the example system 100 of FIG. 1. An internal user may submit a request to share a secure file (e.g., by the internal user computing device 102a), which may be received at the hosting platform 200, and may be interpreted by the one or more processors 202 utilizing one or more components of the secure access application 110. The one or more processors 202 may then utilize the encryption module 110a to generate the secure access link.

The encryption module 110a may generally encrypt the secure access link, so that neither the file name of the secure file nor the storage platform (e.g., storage platform 104a) storing the secure file are included as part of the secure access link. For example, in certain instances, the secure access link may be a web address (e.g., a uniform resource locator (URL)) that directs the external user to the secure access application 110 backend (e.g., secure access application backend 106a), where the application 110 determines whether or not to grant the external user access to the secure file. The web address may typically include one or both of the file name of the secure file and/or the name or an indication of the storage platform on which the secure file is stored. However, including the file name and/or the storage platform in the web address presents a security risk by enabling external users to potentially obtain unauthorized access to the secure file. To avoid this problem, the encryption module 110a may encrypt the web address such that an external user is unable to determine either the file name of the secure file corresponding to the web address or the storage platform where the secure file is stored.

When the encryption module 110a has encrypted the secure access link, the secure access application 110 may transmit the secure access link to an internal user (e.g., at the internal user computing device 102a). Thereafter, the internal user may transmit the secure access link to an external user, and the external user may interact with the secure access link (e.g., clicking, tapping, etc.), and the secure access application 110 may determine whether or not to grant the external user access to the secure file. For example, FIG. 2B illustrates an example workflow for providing access to a secure file utilizing the secure access application 110 of the example system 100 of FIG. 1.

Figure 2B:
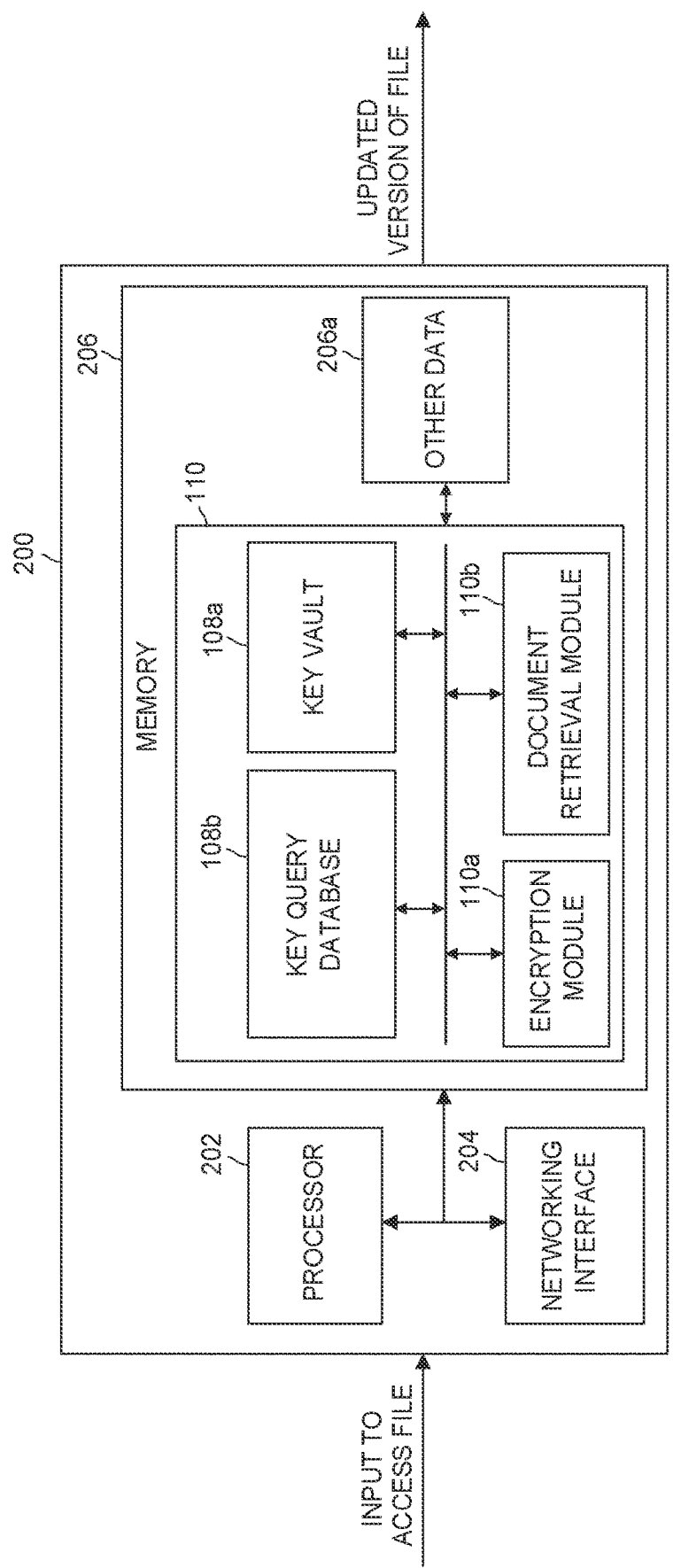
FIG. 2B illustrates an example workflow for providing access to a secure file utilizing a portion of the example system of FIG. 1, in accordance with various embodiments described herein.

As illustrated in FIG. 2B, the hosting platform 200 may receive an input from an external user to access the secure file. The input may be provided through an external user computing device (e.g., external user computing device 102b) that received and/or otherwise has access to the secure access link, and the input may include an access key. The secure access application 110 may process the input by transmitting the access key to the key query database 108b, which validates that the access key included as part of the input matches an access key stored in the key query database 108b. If the key query database 108b confirms that the access key included as part of the input matches an access key stored in the key query database 108b, the database 108b may transmit a signal to the document retrieval module 110b indicating that the access key is valid.

In certain instances, the secure access link may include an indication of the secure file to which the external user is attempting to gain access, but the indication may not be included as part of the link name (e.g., URL) presented to the external user. In this manner, the key query database 108b may additionally validate that the secure file indicated by the secure access link matches the access key included in the key query database 108b, thereby performing an additional validation step to provide additional security for access to the secure file.

Regardless, when the key query database 108b transmits the signal indicating a valid access key to the document retrieval module 110b, the module 110b may access the storage platform (e.g., private storage platform 104a) to retrieve an updated version of the secure file indicated in the input. The secure file stored on the storage platform may generally be accessed by internal users and/or other permitted external users and modified over time, such that the contents of the secure file may change in between subsequent downloads. Accordingly, the document retrieval module 110b may access the storage platform to retrieve the most up-to-date version of the secure file currently stored on the storage platform, and the module 110b may transmit the updated version of the secure file to the external user computing device (e.g., external user computing device 102b) for viewing and/or modification by an external user.

More generally, the one or more processors 202 may be connected to the one or more memories 206 via a computer bus responsible for transmitting electronic data, data packets, or otherwise electronic signals to and from the one or more processors 202 and the one or more memories 206 in order to implement or perform the machine readable instructions, methods, processes, elements or limitations, as illustrated, depicted, or described for the various flowcharts, illustrations, diagrams, figures, and/or other disclosure herein.

The one or more processors 202 may interface with the one or more memories 206 via the computer bus to execute an operating system (OS). The one or more processors 202 may also interface with the one or more memories 206 via the computer bus to create, read, update, delete, or otherwise access or interact with the data stored in the one or more memories 206. The data stored in the one or more memories 206 may include all or part of any of the data or information described herein, including, for example, the secure access application 110, other data 206a, and/or any other data stored in the one or more memories 206.

The hosting platform 200 may further include a networking interface 204 configured to communicate (e.g., send and receive) data via one or more external/network port(s) to one or more networks or local terminals, such as a computer network and/or user computing devices (e.g., devices 102a, 102b) described herein. In some embodiments, the hosting platform 200 may include a client-server platform technology such as ASP.NET, Java J2EE, Ruby on Rails, Node.js, a web service or online API, responsive for receiving and responding to electronic requests. The hosting platform 200 may implement the client-server platform technology that may interact, via the computer bus, with the one or more memories 206 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein. According to some embodiments, the hosting platform 200 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to a computer network. In some embodiments, the computer network may comprise a private network or local area network (LAN). Additionally, or alternatively, the computer network may comprise a public network such as the Internet.

The hosting platform 200 may further include or implement an operator interface configured to present information to an administrator or operator and/or receive inputs from the administrator or operator. For example, an operator interface may provide a display screen (e.g., via internal user computing device 102a). The hosting platform 200 may also provide I/O components (e.g., ports, capacitive or resistive touch sensitive input panels, keys, buttons, lights, LEDs), which may be directly accessible via or attached to the hosting platform 200 or may be indirectly accessible via or attached to an internal user computing device (e.g., 102a). According to some embodiments, an administrator or operator may access the hosting platform 200 by the internal user computing device 102a to review information (e.g., secure file access), make changes, input secure file share requests, and/or perform other functions.

As described above herein, in some embodiments, the hosting platform 200 may perform the functionalities as discussed herein as part of a "cloud" network or may otherwise communicate with other hardware or software components within the cloud to send, retrieve, or otherwise analyze data or information described herein.

In general, a computer program or computer based product, application, or code (e.g., the secure access application 110, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 202 (e.g., working in connection with the data in the one or more memories 206) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 206 may include one or more forms of non-transitory, volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In certain aspects, the one or more memories 206 may store an operating system (OS) (e.g., Microsoft Windows, Linux, Unix, etc.) capable of facilitating the functionalities, applications, methods, or other software as discussed herein.

The one or more memories 206 may also store the secure access application 110, as well as other data 206a, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, or otherwise be part of the secure access application 110, where each may be configured to facilitate their various functionalities discussed herein. It should be appreciated that one or more other applications may be envisioned and that are executed by the one or more processors 202.

To provide a better understanding of the functionalities disclosed above regarding the secure access application 110, the user interfaces of FIGS. 3A-3D illustrate an internal user sharing a secure file. More specifically, FIGS. 3A-3D are a series of user interfaces that are configured to enable a user to generate and transmit a secure access link providing temporary document access to another user, in accordance with various embodiments described herein.

FIG. 3A generally illustrates a GUI 300 rendered by the storage platform (e.g., private storage platform 104a) that is configured to enable an internal user to share a secure file. In particular, the GUI 300 includes an internal documents list 302, which an internal user may interact with in order to access one or more secure files 302a-c. When an internal user interacts with a secure file 302d, the GUI 300 may render a secure file options list 304 that includes multiple functionalities corresponding to the secure file 302d. For example, the secure file options list 304 may include an option to share, open, preview, delete, move, copy, and/or any other suitable functionality with respect to the secure file 302d. Of particular note, is the share one-time option 304a, which enables the internal user to begin the process of securely sharing the secure file, in accordance with the techniques described above and herein.

Figure 3B:
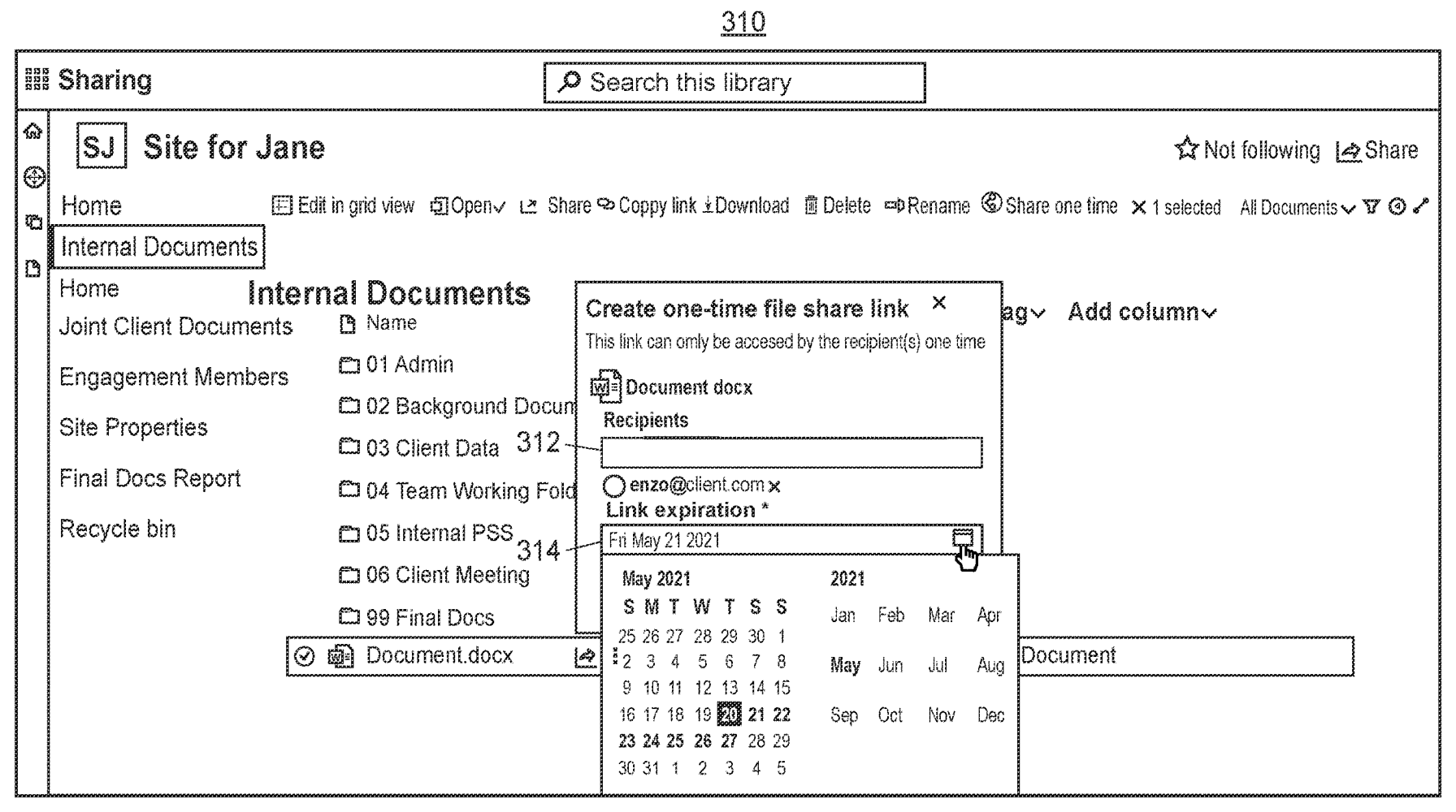

When the internal user selects and/or otherwise interacts with the share one-time option 304a, the storage platform may render the GUI 310 of FIG. 3B, that includes secure access link generation options. Using the GUI 310, the internal user may indicate recipients for the secure access link by entering contact credentials (e.g., an email address) corresponding to the intended recipients in the recipients field 312. Of course, the intended recipients may correspond to internal and/or external users, but internal users who already have access credentials for the private storage platform may not require such a secure access link.

Nevertheless, the internal user may enter any suitable contact credentials into the recipients field 312, and also designate an accessibility duration for the secure access link in the expiration field 314. As previously mentioned, the secure access link may only enable a user to access the secure file during an accessibility duration, after which, the secure access link will no longer enable the user to access the secure file. Thus, the internal user may specify how long the accessibility duration for the secure access link will be based on the internal user's input at the expiration field 314. Generally, the accessibility duration may begin expiring upon the transmission of the secure access link to the external user, but in some aspects, the accessibility duration may only begin upon an initial download and/or other accessing of the secure file by the external user interacting with the secure access link. In certain aspects, the default accessibility duration may be one week, thereby allowing an external user one week in which to access the secure file through the secure access link.

Figure 3C:
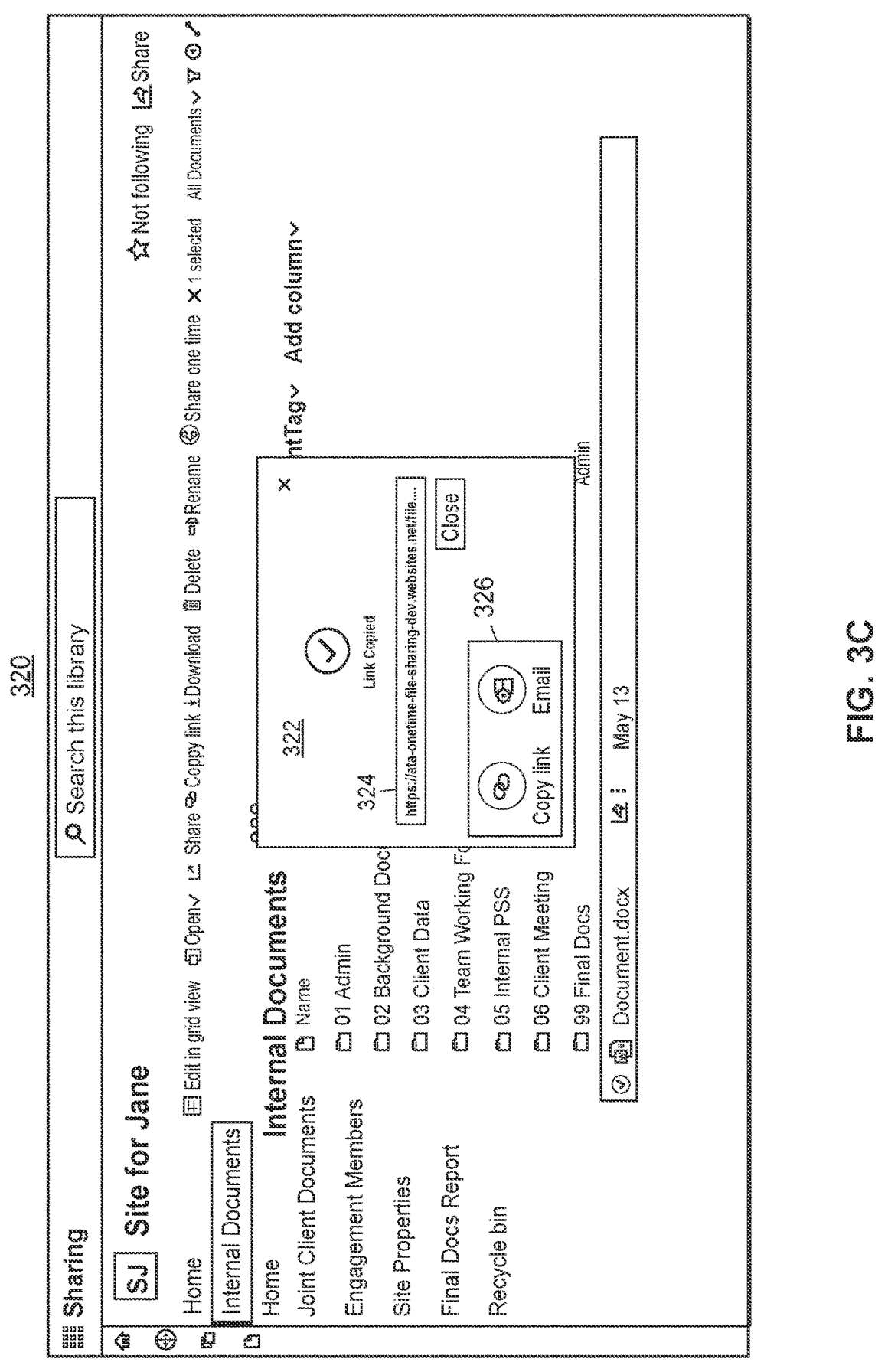

After the internal user has specified any/all intended recipients for the secure access link and the accessibility duration, the storage platform may render the GUI 320 of FIG. 3C that includes the secure access link 324 for transmission to an external user. The GUI 320 includes a secure access link box 322 showing the secure access link 324 with transmission options 326 that include copying the link 324, automatically populating a message (e.g., an email) to the external user with the secure access link 324, and/or any other suitable transmission option.

Figure 3D:
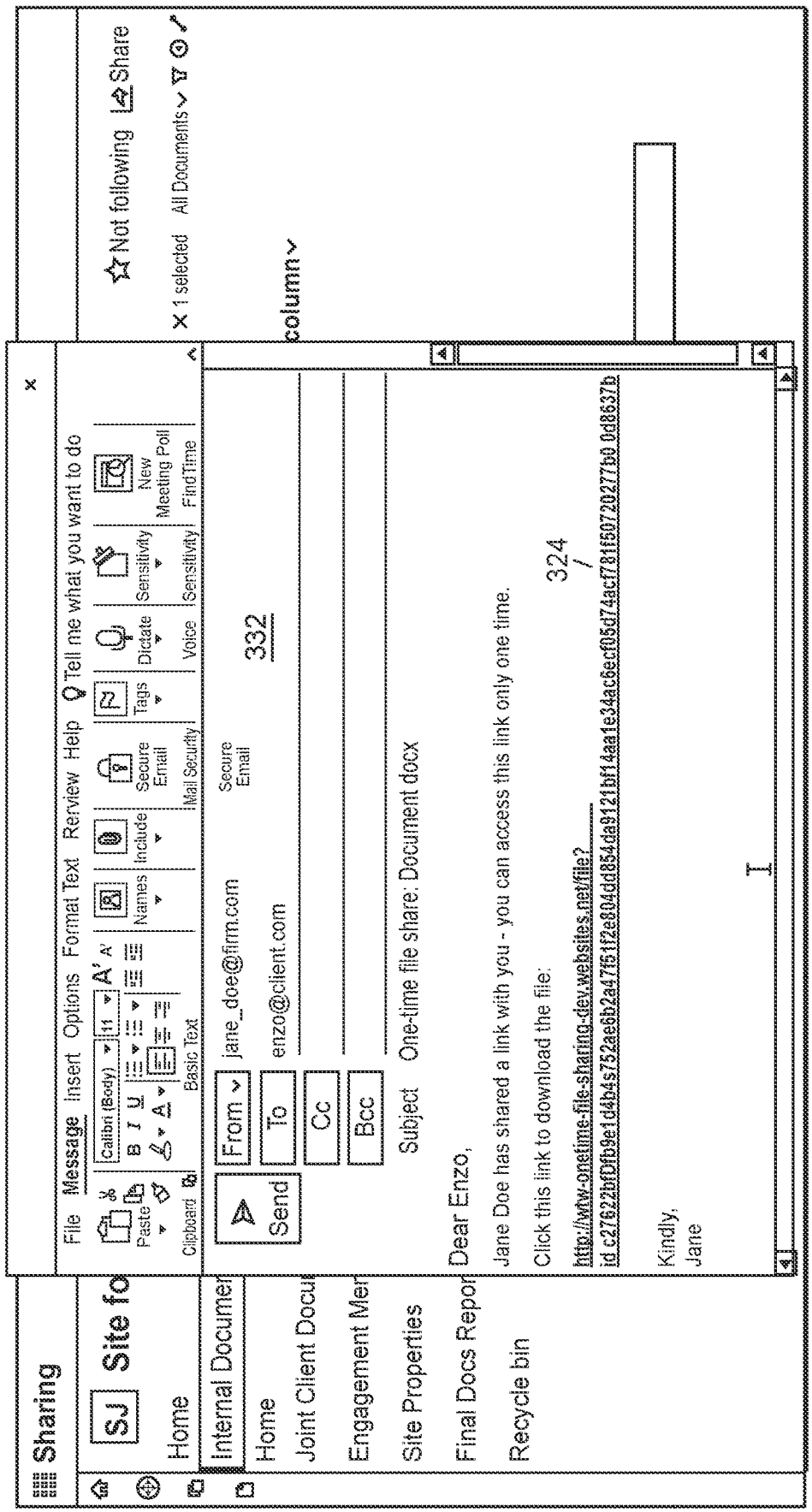

As an example, when the internal user selects the automatically populating a message option, the storage platform may render the GUI 330 of FIG. 3D, that includes a message area 332. The message area 332 may include the contact credentials of the external user, and may further include the secure access link 324 from the previous GUI 320. The message may indicate the accessibility duration to the external user, and may additionally indicate other access limitations associated with the secure access link 324. Namely, as illustrated in FIG. 3D, the message may indicate that the external user may only access the secure file through the secure access link 324 one time. The external user may thus interact with the secure access link 324 (e.g., click, tap, etc.), access the secure file, and thereafter lose the ability to access the secure file through the secure access link 324. Of course, in other aspects, the secure access link may enable an external user to download the secure file any number of times, including unlimited access until the accessibility duration elapses.

Figure 4A:
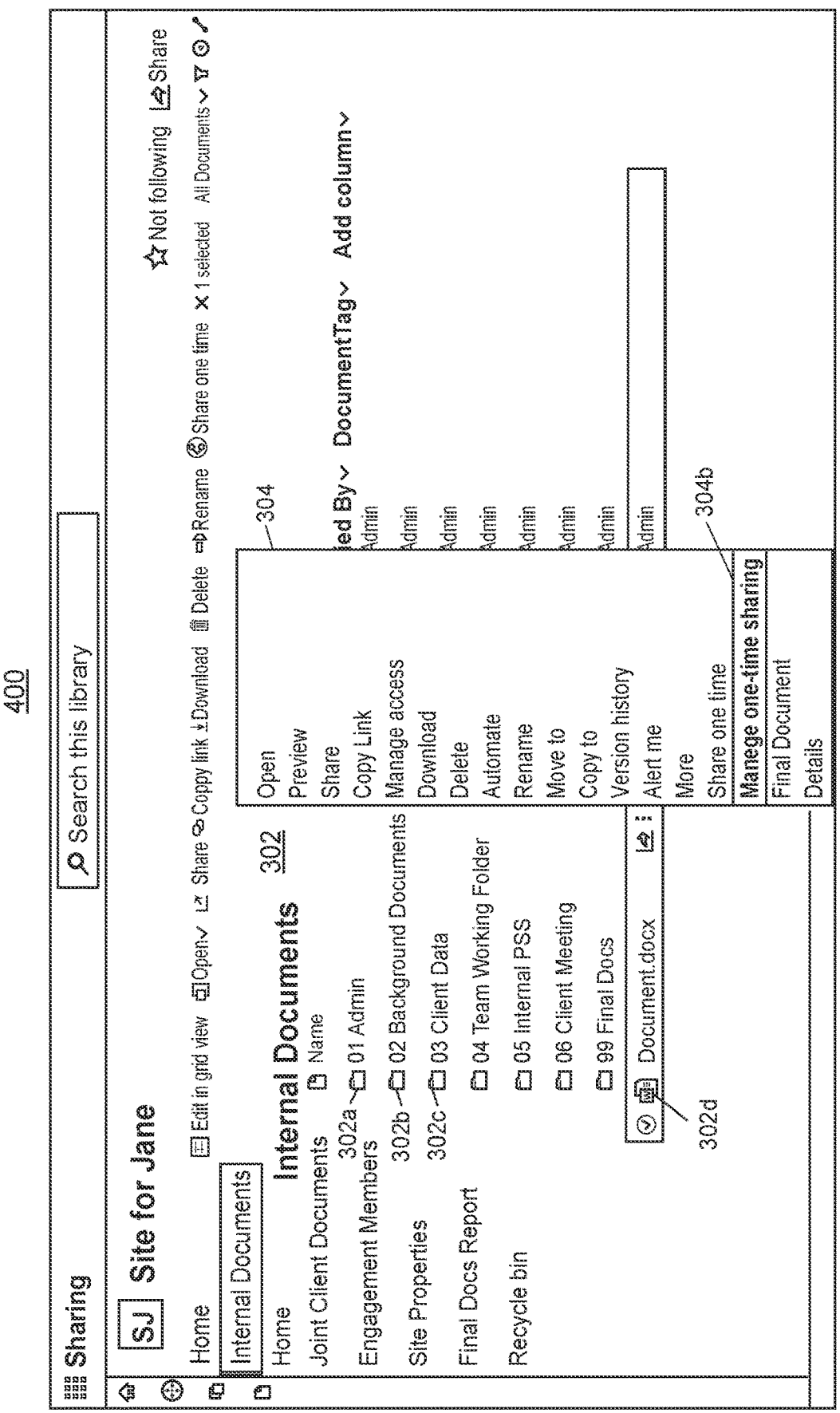
Figure 4B:
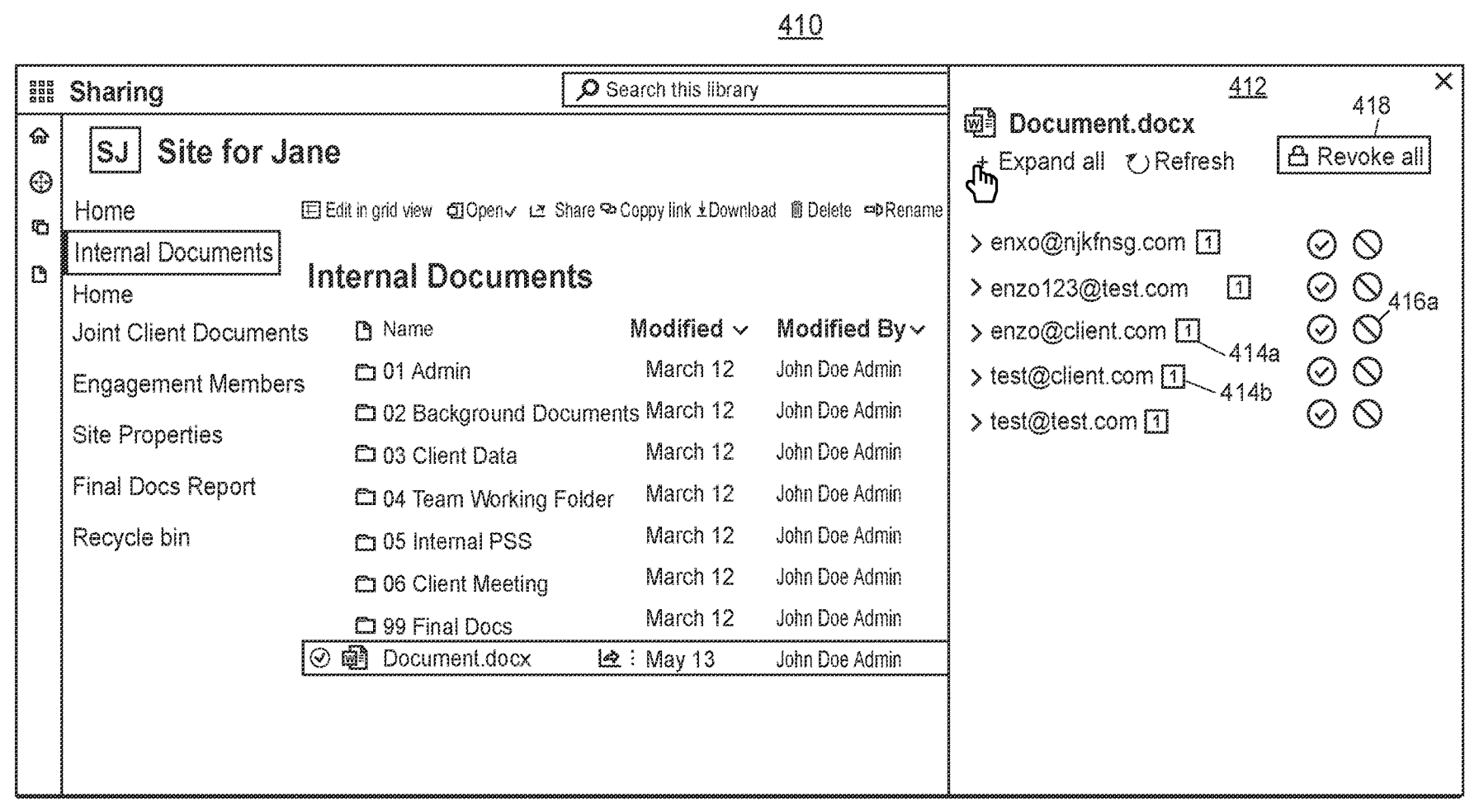

When the internal user has shared the secure file with other users (e.g., external users), the internal user may desire to check and/or otherwise track the downloads or other interactions with the secure file. FIGS. 4A-4C each illustrate a portion of an internal user managing a secure file. More specifically, FIGS. 4A-4C are another series of user interfaces that are configured to enable a user to manage the secure file sharing activity of other users that have been provided temporary access to a secure file, in accordance with various embodiments described herein.

FIG. 4A illustrates a GUI 400 rendered by the storage platform (e.g., private storage platform 104a) that is similar to the GUI 300 of FIG. 3A. In particular, the GUI 400 features the internal user selecting a manage one-time sharing access option 304b in the secure file options list 304 in order to manage the sharing and to view the records corresponding to the secure file as a result of sharing. When the internal user selects the manage one-time sharing access option 304b, the storage platform may render a subsequent GUI 410, illustrated in FIG. 4B, that includes a file management registry 412.

As shown in FIG. 4B, the file management registry 412 lists the contact credentials for each user to which the secure file has been shared. The listed contact credentials may be updated by the storage platform in real-time as the internal user transmits the secure access link to external users, and may enable the internal user the opportunity to revoke the access provided by the secure access link for any particular user. For example, assume that the internal user provides temporary access to the secure file to external users 414a, 414b through a secure access link, and the internal user determines that external user 414a should no longer have access to the secure file. Despite the fact that the secure access link may automatically revoke external user's 414a access once the accessibility duration elapses, the internal user may actively revoke the external user's 414a access by interacting with the access revocation button 416a. Interacting with the access revocation button 416a may remove the external user 414a from the list of authorized users who have access to the secure file. Moreover, in the event that the internal user desires to revoke all authorized users' access, the internal user may interact with the universal access revocation button 418 to remove all listed users from the file management registry 412.

Beyond determining whether or not a particular user should have access to a secure file, the file management registry 412 may enable an internal user to determine when particular users have downloaded and/or otherwise accessed the secure file. For example, as illustrated in FIG. 4C, the GUI 420 depicts the file management registry 412 when a user expands the individual user sections, to view how/when each user has accessed the secure file. The external user 414a may have accessed the secure file on the 20$^{th}$ of May, whereas the external user 414b may have accessed the secure file on the 19$^{th}$ of May. In certain embodiments, the file management registry 412 may additionally display a time when each user downloaded and/or otherwise accessed the secure file, and may also indicate whether or not each user modified the secure file.

Figure 5:
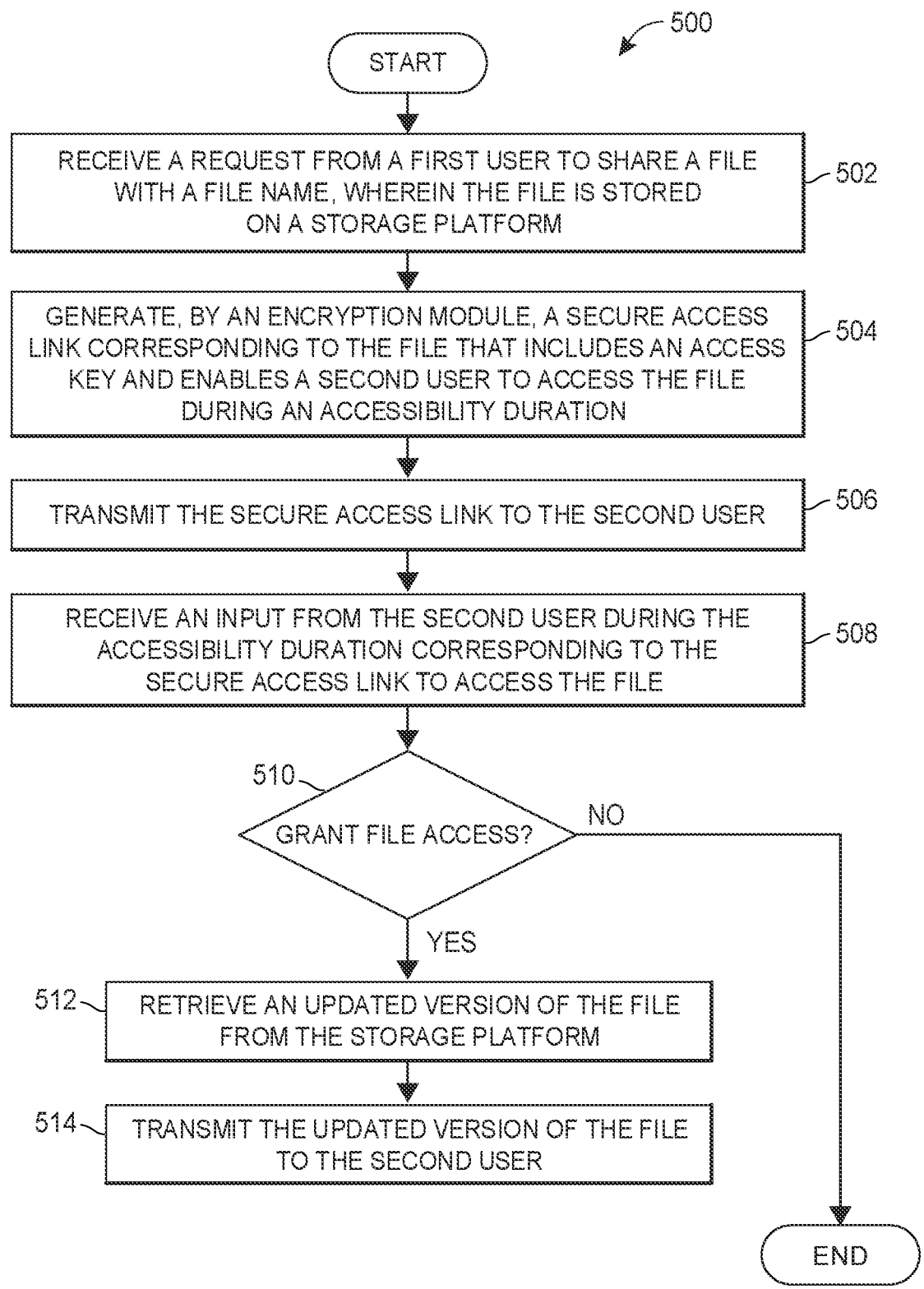
FIG. 5 illustrates an example method for providing temporary document access for secure file sharing, in accordance with various embodiments described herein.

FIG. 5 illustrates a flow chart of an example method 500 for providing temporary document access for secure file sharing, in accordance with various embodiments herein. At least portions of the method 500 may be performed by one or more processors (e.g., one or more processors 202) utilizing the embodiments of the internal user computing device 102a, the external user computing device 102b, and/or the secure access application 110 of FIG. 1, for example, or by other suitable modules or systems. In embodiments, the method 500 may include additional or alternate steps other than those described herein.

The method 500 may include receiving, by one or more processors, a request from a first user to share a file with second user (block 502). The file may include a file name, and may be stored on a storage platform. For example, the first user may be an internal user, the second user may be an external user, and the file may be a secure file stored on a storage platform (e.g., private storage platform 104a). The method 500 may also include generating, by an encryption module (e.g., encryption module 110a), a secure access link corresponding to the file that includes an access key and enables a second user to access the file during an accessibility duration (block 504). The encryption module may encrypt the secure access link, such that the link does not indicate the storage platform or the file name. As previously mentioned, in instances where the secure access link is a web address (e.g., a URL), the encryption module may encrypt the secure access link such that the file name of the secure file and the storage platform are not included in the web address.

The method 500 may also include transmitting, by the one or more processors, the secure access link to the second user (block 506). The first user may generally transmit the secure access link to the second user across a computer network through a direct message (e.g., email) using an internal user computing device (e.g., internal user computing device 102a). In certain aspects, the secure access application 110 may transmit the secure access link to the external user.

In some aspects, and responsive to transmitting the secure access link to the second user, the method 500 may also include tracking, by the one or more processors, an active accessibility period of the secure access link. In these aspects, the processors (e.g., one or more processors 202) may track the active accessibility period by continually updating how long each external user has had access to the secure file through the secure access link. Periodically, the one or more processors may also compare the accessibility duration to the active accessibility period to determine whether or not the active accessibility period has exceeded the accessibility duration. It should be understood that both the accessibility duration and the active accessibility period may be different for each user to whom the internal user grants access through a secure access link. In any event, in certain aspects, the method 500 may also include disabling, by the one or more processors, the second user from accessing the file through the secure access link when the active accessibility period exceeds the accessibility duration. Moreover, in some aspects, the accessibility duration is one week.

In certain aspects, the method 500 may also include disabling, by the one or more processors, the second user from accessing the file through the secure access link when the first user inputs an access revocation request through the storage platform. For example, the access revocation request may correspond to the first user interacting with the access revocation button 416a and/or the universal access revocation button 418, as illustrated in FIG. 4B.

The method 500 may also include receiving, by the one or more processors, an input from the second user during the accessibility duration corresponding to the secure access link to access the file (block 508). For example, the second user may interact with the secure access link through a user computing device (e.g., external user computing device 102b) to generate an input and thereby access the secure file.

Responsive to receiving the input, the method 500 may also include validating, by the one or more processors, the access key to determine whether or not the second user should be granted access to the file (block 510). As previously described, the key query database 108b may query the key query database 108b to determine whether or not the access key included as part of the input matches an access key stored in the key query database 108b. If the key query database 108b determines that the access key included as part of the input does not match an access key stored in the key query database 108b (NO branch of block 510), then the method 500 may end, as the second user may not be granted access to the secure file. However, if the key query database 108b determines that the access key included as part of the input matches an access key stored in the key query database 108b (YES branch of block 510), then the method 500 may proceed to block 512, as the second user may be granted access to the secure file.

Responsive to determining that the user should be granted access to the file, the method 500 also includes retrieving, by the one or more processors, an updated version of the file from the storage platform (block 512). Thereafter, the method 500 may also include transmitting, by the one or more processors, the updated version of the file to the second user (block 514).

In certain aspects, the method 500 may also include updating, by the one or more processors, a file management registry (e.g., file management registry 412) corresponding to the file when the second user accesses the file through the secure access link. The file management registry may include indications corresponding to transmissions of the updated version of the file to the second user, and the method 500 may further include updating, by the one or more processors, the file management registry after each transmission of the updated version of the file to the second user through the secure access link. In some aspects, the method 500 may also include updating, by the one or more processors, the file management registry corresponding to the file when another user accesses the file through the secure access link, wherein the another user is different from the first user and the second user.

In some aspects, the method 500 may also include tracking, by the one or more processors, a number of downloads corresponding to the file through the secure access link. Further in these aspects, the method 500 may also include automatically revoking, by the one or more processors, access to the file through the secure access link when the number of downloads exceeds a download threshold. For example, the first user may designate that a second user may only download the secure file 2 times during the accessibility duration of the secure access link. Once the second user downloads the secure file twice, the secure access link provided to the second user may automatically lose the ability to provide the second user access to the secure file, regardless of whether or not the active accessibility period of the secure access link has exceeded the accessibility duration.

Moreover, in certain aspects, the method 500 may also include transmitting, by the one or more processors, the updated version of the file to the second user, wherein the updated version of the file is an updated digital preview of the file that is watermarked with an identifier corresponding to the second user. In this manner, the updated version of the file may include identifying information that reduces the chances that the second user may be able to impermissibly modify and/or otherwise utilize the secure file in a fashion that is undesirable to the first user.

Thus, in view of the above, the novel systems, methods, and techniques disclosed herein provide increased overall file sharing security across file storage platforms without need to provision explicit access credentials for each intended recipient of the secure file, by automatically generating a secure access link. For example, the methods more securely and more efficiently share secure files when compared to conventional methods/techniques by generating secure access links with access keys that do not identify the secure file name or the storage platform name, thereby generally increasing the data security and reducing the ability of external users to fraudulently access, modify, and/or otherwise interact with the secure files. Without the secure access links of the present techniques, each external user may have to receive provisioned credentials, manage their log in credentials, log in to the storage platform, navigate the storage platform, locate the secure file, and generally familiarize themselves with foreign software, such that any secure files are substantially more complicated to access. Moreover, in lieu of provisioning access credentials, sharing the secure file directly with external users by means of conventional techniques enables the external users unbridled access to the secure files, thereby enabling the external users to impermissibly modify, download, and/or otherwise access the secure files.

Accordingly, conventional systems consistently fail to provide convenient, secure access to secure files across a storage platform, but the techniques of the present disclosure solve these issues through the highly secure and efficient secure access links that provide external users easy access to secure files in a manner that simultaneously allows internal users the ability to control the levels of access permitted to each external user.

ADDITIONAL CONSIDERATIONS

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although user operations of one or more methods are illustrated and described as separate operations, one or more of the user operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112 (f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for providing temporary document access for secure file sharing, the method comprising:
   receiving, by one or more processors, a request from a first user to share a file with a second user, wherein the file includes a file name and is stored on a storage platform;
   generating, by an encryption module, a secure access link corresponding to the file that includes an access key and enables the second user to access the file during an accessibility duration, wherein the secure access link does not indicate the storage platform or the file name;
   transmitting, by the one or more processors, the secure access link to the second user;
   receiving, by the one or more processors, an input from the second user during the accessibility duration corresponding to the secure access link to access the file;
   responsive to receiving the input, validating, by the one or more processors, the access key to determine whether or not the second user should be granted access to the file;

responsive to determining that the user should be granted access to the file, retrieving, by the one or more processors, an updated version of the file from the storage platform; and transmitting, by the one or more processors, the updated version of the file to the second user.

2. The method of claim 1, further comprising:
responsive to transmitting the secure access link to the second user, tracking, by the one or more processors, an active accessibility period of the secure access link; and
comparing, by the one or more processors, the accessibility duration to the active accessibility period.

3. The method of claim 2, further comprising:
disabling, by the one or more processors, the second user from accessing the file through the secure access link when the active accessibility period exceeds the accessibility duration.

4. The method of claim 2, wherein the accessibility duration is one week.

5. The method of claim 1, further comprising:
updating, by the one or more processors, a file management registry corresponding to the file when the second user accesses the file through the secure access link.

6. The method of claim 5, wherein the file management registry includes indications corresponding to transmissions of the updated version of the file to the second user, and the method further comprises:
updating, by the one or more processors, the file management registry after each transmission of the updated version of the file to the second user through the secure access link.

7. The method of claim 5, further comprising:
updating, by the one or more processors, the file management registry corresponding to the file when another user accesses the file through the secure access link, wherein the another user is different from the first user and the second user.

8. The method of claim 1, further comprising:
disabling, by the one or more processors, the second user from accessing the file through the secure access link when the first user inputs an access revocation request through the storage platform.

9. The method of claim 1, further comprising:
tracking, by the one or more processors, a number of downloads corresponding to the file through the secure access link; and
automatically revoking, by the one or more processors, access to the file through the secure access link when the number of downloads exceeds a download threshold.

10. The method of claim 1, further comprising:
transmitting, by the one or more processors, the updated version of the file to the second user, wherein the updated version of the file is an updated digital preview of the file that is watermarked with an identifier corresponding to the second user.

11. A system for providing temporary document access for secure file sharing, the system comprising:
a memory storing a set of computer-readable instructions comprising at least an encryption module; and
a processor interfacing with the memory, and configured to execute the set of computer-readable instructions to cause the processor to:
receive a request from a first user to share a file with a second user, wherein the file includes a file name and is stored on a storage platform, generate, by the encryption module, a secure access link corresponding to the file that includes an access key and enables the second user to access the file during an accessibility duration, wherein the secure access link does not indicate the storage platform or the file name, transmit the secure access link to the second user, receive an input from the second user during the accessibility duration corresponding to the secure access link to access the file, responsive to receiving the input, validate the access key to determine whether or not the second user should be granted access to the file, responsive to determining that the user should be granted access to the file, retrieve an updated version of the file from the storage platform, and transmit the updated version of the file to the second user.

12. The system of claim 11, wherein the set of computer-readable instructions, when executed, further cause the processor to:
responsive to transmitting the secure access link to the second user, track an active accessibility period of the secure access link, and
compare the accessibility duration to the active accessibility period.

13. The system of claim 12, wherein the set of computer-readable instructions, when executed, further cause the processor to:
disable the second user from accessing the file through the secure access link when the active accessibility period exceeds the accessibility duration.

14. The system of claim 11, wherein the set of computer-readable instructions, when executed, further cause the processor to:
update a file management registry corresponding to the file when the second user accesses the file through the secure access link.

15. The system of claim 14, wherein the file management registry includes indications corresponding to transmissions of the updated version of the file to the second user, and the set of computer-readable instructions, when executed, further cause the processor to:
update the file management registry after each transmission of the updated version of the file to the second user through the secure access link.

16. The system of claim 14, wherein the set of computer-readable instructions, when executed, further cause the processor to:
update the file management registry corresponding to the file when another user accesses the file through the secure access link, wherein the another user is different from the first user and the second user.

17. The system of claim 11, wherein the set of computer-readable instructions, when executed, further cause the processor to:
disable the second user from accessing the file through the secure access link when the first user inputs an access revocation request through the storage platform.

18. The system of claim 11, wherein the set of computer-readable instructions, when executed, further cause the processor to:
track a number of downloads corresponding to the file through the secure access link, and
automatically revoke access to the file through the secure access link when the number of downloads exceeds a download threshold.

19. The system of claim 11, wherein the set of computer-readable instructions, when executed, further cause the processor to:

transmit the updated version of the file to the second user, wherein the updated version of the file is an updated digital preview of the file that is watermarked with an identifier corresponding to the second user.

20. A non-transitory computer-readable storage medium having stored thereon a set of instructions, executable by at least one processor, for providing temporary document access for secure file sharing, the instructions comprising:

instructions for receiving a request from a first user to share a file with a second user, wherein the file includes a file name and is stored on a storage platform;

instructions for generating, by an encryption module, a secure access link corresponding to the file that includes an access key and enables the second user to access the file during an accessibility duration, wherein the secure access link does not indicate the storage platform or the file name;

instructions for transmitting the secure access link to the second user;

instructions for receiving an input from the second user during the accessibility duration corresponding to the secure access link to access the file;

responsive to receiving the input, instructions for validating the access key to determine whether or not the second user should be granted access to the file;

responsive to determining that the user should be granted access to the file, instructions for retrieving an updated version of the file from the storage platform; and instructions for transmitting the updated version of the file to the second user.

\* \* \* \* \*